(12) United States Patent
Tazzia

(10) Patent No.: US 8,062,760 B2
(45) Date of Patent: Nov. 22, 2011

(54) ELECTROCOAT COMPOSITION AND PROCESS

(75) Inventor: Charles L Tazzia, Grosse Pointe Farms, MI (US)

(73) Assignee: BASF Coatings GmbH, Muenster (DE)

(*) Notice: Subject to any disclaimer, the term of this patent is extended or adjusted under 35 U.S.C. 154(b) by 825 days.

(21) Appl. No.: 12/142,353

(22) Filed: Jun. 19, 2008

(65) Prior Publication Data

US 2009/0317645 A1 Dec. 24, 2009

(51) Int. Cl.
*B32B 27/16* (2006.01)
*C09D 5/44* (2006.01)
*C25D 13/06* (2006.01)

(52) U.S. Cl. ............... 428/474.4; 204/489; 204/499; 204/502; 204/504; 204/505; 205/317

(58) Field of Classification Search ............... 428/474.4; 204/489, 499, 502, 504, 505; 205/317
See application file for complete search history.

(56) References Cited

U.S. PATENT DOCUMENTS

| | | | |
|---|---|---|---|
| 6,190,523 B1 * | 2/2001 | Tazzia | 204/484 |
| 6,214,470 B1 * | 4/2001 | Tazzia et al. | 428/425.8 |
| 6,951,602 B1 | 10/2005 | Reuter et al. | |
| 7,314,900 B2 * | 1/2008 | Tazzia et al. | 524/800 |
| 2007/0234761 A1 * | 10/2007 | Tazzia et al. | 65/163 |

* cited by examiner

*Primary Examiner* — Timothy J. Kugel
(74) *Attorney, Agent, or Firm* — Harness, Dickey & Pierce, P.L.C.

(57) ABSTRACT

An electrodeposition coating composition comprises an unhydrolyzed or at least partially hydrolyzed polyvinyl formamide polymer for improved edge coverage of the coating when plated onto a conductive substrate. The plated coating can be cured.

15 Claims, No Drawings

ELECTROCOAT COMPOSITION AND PROCESS

FIELD OF THE DISCLOSURE

The invention relates electrocoat coating compositions, methods of preparing them, methods of electrodeposition of coatings onto a conductive substrate, and electrodeposited coatings.

BACKGROUND OF THE DISCLOSURE

The statements in this section merely provide background information related to this disclosure and may not constitute prior art.

Electrodeposition coating ("electrocoat") compositions and methods are widely used in industry today. Electrocoat baths usually comprise an aqueous dispersion or emulsion including a principal film-forming epoxy resin ("polymer" and "resin" are used interchangeably in this disclosure), having ionic stabilization in water or a mixture of water and organic cosolvent. In automotive or industrial applications for which durable electrocoat films are desired, the electrocoat compositions are formulated to be curable (thermosetting) compositions. This is usually accomplished by emulsifying with the principal film-forming resin a crosslinking agent that can react with functional groups on the principal resin under appropriate conditions, such as with the application of heat, and so cure the coating. During electrodeposition, coating material containing the ionically-charged resin having a relatively low molecular weight is deposited onto a conductive substrate by submerging the substrate in the electrocoat bath and then applying an electrical potential between the substrate and a pole of opposite charge, for example, a stainless steel electrode. The charged coating material migrates to and deposits on the conductive substrate. The coated substrate is then heated to cure or crosslink the coating.

One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anti-corrosion effectiveness. One desirable feature for an electrodeposited (or electrocoat) coating, then is uniform edge coverage. That is, it is important for corrosion protection that the film thickness (or filmbuild) on the edges of an article is as thick as it is on the interior portions of the article. Reuter et al., U.S. Pat. No. 6,951,602 (corresponding to WO 01/02498) describes addition of a water-soluble polyvinyl alcohol (co) polymer or mixture of polyvinyl alcohol (co)polymers to electrodeposition baths for edge protection and contamination resistance; the Reuter publication also describes other methods that have been used for edge protection against corrosion.

The cured layer of electrodeposited coating is typically overcoated with one or more layers of different, additional coatings, e.g. other primer layers and topcoat layers. Film smoothness of the electrodeposited coating is another important property because a smoother electrodeposited coating should minimize the coating thicknesses of the additional layers of coatings required to achieve a smooth finish.

SUMMARY OF THE DISCLOSURE

The present disclosure describes an aqueous electrodeposition coating composition, also called an aqueous electrodeposition bath, comprising a binder that is electrodepositable and an unhydrolyzed or at least partially hydrolyzed poly(vinyl formamide) polymer. The at least partially hydrolyzed polyvinyl formamide polymer can be fully hydrolyzed, and the unhydrolyzed or at least partially hydrolyzed polyvinyl formamide polymer can contain monomer units from a comonomer other than vinyl formamide. The binder can be electrodepositable either cathodically or anodically. Automotive applications generally use cathodically electrodepositable binders. "Binder" refers to the film-forming components of the coating composition. Typically the binder is thermosetting or curable, comprising either a self-crosslinking resin or polymer or a resin or polymer combined with a crosslinker that reacts with the resin or polymer under curing conditions. For convenience, "resin" is used in this disclosure to encompass both resin and polymer. In some embodiments, the binder may comprise a crosslinker that also reacts with the hydrolyzed polyvinyl formamide under curing conditions.

A method of coating an electrically conductive substrate comprises placing the electrically conductive substrate into an aqueous electrodeposition coating composition comprising a binder that is electrodepositable and an unhydrolyzed or at least partially hydrolyzed poly(vinyl formamide) polymer and, using the electrically conductive substrate as one electrode, passing a current through the aqueous electrodeposition coating composition causing a coating layer to deposit onto the electrically conductive substrate. The deposited coating layer may then be cured to a cured coating layer. Subsequent coating layers may be applied on the deposited (optionally cured) coating layer. For example, the deposited coating layer may be a primer layer and other layers such as an optional spray-applied primer surfacer and a topcoat layer or topcoat layers (e.g., a colored basecoat layer and a clearcoat layer) may be applied over the deposited coating layer.

A coated electrically conductive substrate, comprising an electrically deposited coating layer on the substrate, the electrically deposited coating layer comprising an unhydrolyzed or at least partially hydrolyzed polyvinyl formamide polymer. The presence of the unhydrolyzed or hydrolyzed polyvinyl formamide polymer in the electrically deposited coating layer provides improved rheology control and better edge coverage. The electrically deposited coating layer has much better film smoothness. It has been found that these benefits are generally available even when the unhydrolyzed or hydrolyzed polyvinyl formamide polymer is included in the electrodeposition bath in very modest amounts. The coatings have excellent edge coverage and protection, have contamination resistance, especially to oils, and the electrodepositable coating baths are uncomplicated to prepare and have long-term stability. Compared to prior polymeric additives that have been used for this purpose, such as polyvinyl alcohol, unhydrolyzed or at least partially hydrolyzed the polyvinyl formamide polymer produces the desired edge coverage even used in lower amounts.

"A" and "an" as used herein indicate "at least one" of the item is present; a plurality of such items may be present, when possible. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

An aqueous electrodeposition coating composition is disclosed that comprises (A) a binder, wherein the binder is electrodepositable cathodically or anodically and (B) an unhydrolyzed or at least partially hydrolyzed polyvinyl formamide polymer.

The polyvinyl formamide polymer may be unhydrolyzed or partially or fully hydrolyzed. Hydrolysis of the formamide group provides a primary amine group; full hydrolysis of the polyvinyl formamide polymer provides a poly(vinyl amine). Hydrolyzed polyvinyl formamide polymers are commercially available from BASF under the trademark "LUAMIN®" with various weight average molecular weights (from about 340,000 dalton to less than 10,000 daltons) and various degrees of hydrolysis (10%, 30%, and 90%). The unhydrolyzed or hydrolyzed polyvinyl formamide polymer may also include monomer units other than vinyl amide and vinyl amine monomer units. In one embodiment of such a copolymer, vinyl formamide may be copolymerized with vinyl acetate; hydrolysis of the resulting copolymer may provide vinyl alcohol monomer units as well as vinyl amine monomer units. In one embodiment, the polyvinyl formamide polymer comprises only vinyl amide and vinyl amine monomer units (that is, the polyvinyl formamide polymer is a homopolymer of vinyl formamide or an at least partially hydrolyzed homopolymer of vinyl formamide).

The aqueous electrodeposition coating composition comprises a minor amount of the unhydrolyzed or hydrolyzed polyvinyl formamide polymer, generally less than one percent by weight of the coating composition. For example, the aqueous electrodeposition coating composition may comprises at least about 25 ppm by weight of the unhydrolyzed or hydrolyzed polyvinyl formamide polymer; in other examples, the aqueous electrodeposition coating composition may comprises at least about 50 ppm by weight of the unhydrolyzed or hydrolyzed polyvinyl formamide polymer. The unhydrolyzed or hydrolyzed polyvinyl formamide polymer has been observed to be effective at very modest levels in aqueous electrodeposition coating compositions. For example, the aqueous electrodeposition coating composition may comprises up to about 1000 ppm by weight of the unhydrolyzed or hydrolyzed polyvinyl formamide polymer; in other examples, the aqueous electrodeposition coating composition may comprises up to about 100 ppm by weight of the unhydrolyzed or hydrolyzed polyvinyl formamide polymer. It has been observed that an aqueous electrodeposition coating composition with a binder comprising an epoxy resin provides excellent edge coverage and other coating properties when the aqueous electrodeposition coating composition comprises about 50 ppm to about 100 ppm of the unhydrolyzed or hydrolyzed polyvinyl formamide polymer. Determining the optimum amount of the unhydrolyzed or hydrolyzed polyvinyl formamide polymer for a particular aqueous electrodeposition coating composition is straightforward, and, in general, satisfactory results may be achieved with amounts of the unhydrolyzed or hydrolyzed polyvinyl formamide polymer of less than 1000 ppm based on weight of the aqueous electrodeposition coating composition.

The electrodeposition coating composition comprises a binder including a resin that is electrodepositable. A variety of such resins are known, including without limitation, acrylic, polyester, epoxy, and polybutadiene resins Automotive electrocoating applications typically use an electrodepositable resin that is cathodic, i.e., it has salted basic groups (e.g., primary, secondary, or tertiary amine groups) or quaternary groups (e.g., ammonium, sulfonium, or phosphonium groups). In a cathodic electrocoating process, the article to be coated is the cathode. Water-dispersible resins used in the cathodic electrodeposition coating process have a cationic functional group such as primary, secondary, tertiary, and/or quaternary amine moiety as a positively chargeable hydrophilic group.

Examples of suitable resins include epoxy resins, polyesters, polyurethanes, vinyl resins such as polyacrylate resins, and polybutadiene resins. In a preferred embodiment, the resin is an epoxy resin functionalized with amine groups. Preferably, the epoxy resin is prepared from a polyglycidyl ether. Preferably, the polyglycidyl ether of is the polyglycidyl ether of bisphenol A or similar polyphenols. It may also be advantageous to extend the epoxy resin by reacting an excess of epoxide group equivalents with a modifying material, such as a polyol, a polyamine or a polycarboxylic acid, in order to improve the film properties. Preferably, the polyglycidyl ether is extended with bisphenol A. Useful epoxy resins of this kind have a weight average molecular weight, which can be determined by GPC, of from about 3000 to about 6000. Epoxy equivalent weights can range from about 200 to about 2500, and are preferably from about 500 to about 1500.

Amino groups can be incorporated by reacting the polyglycidyl ethers of the polyphenols with amine or polyamines. Typical amines and polyamines include, without limitation, dibutylamine, ethylenediamine, diethylenetriamine, triethylenetetramine, dimethylaminopropylamine, dimethylaminobutylamine, diethylaminopropylamine, diethylaminobutylamine, dipropylamine, and similar compounds, and combinations thereof. In a preferred embodiment, the epoxide groups on the epoxy resin are reacted with a compound comprising a secondary amine group and at least one latent primary amine. The latent primary amine group is preferably a ketimine group. The primary amines are regenerated when the resin is emulsified.

Quarternary ammonium groups may be incorporated, and are formed, for example, from a tertiary amine by salting it with an acid, then reacting the salting hydrogen with, e.g., a compound bearing an epoxide group to produce an ammonium group. Resins used according to the invention preferably have a primary amine equivalent weight of about 300 to about 3000, and more preferably of about 850 to about 1300.

Epoxy-modified novolacs can be used as the resin in the present invention. The epoxy-novolac resin can be capped in the same way as previously described for the epoxy resin.

Cationic polyurethanes and polyesters may also be used. Such materials may be prepared by endcapping with, for example, an aminoalcohol or, in the case of the polyurethane, the same compound comprising a saltable amine group previously described may also be useful.

Polybutadiene, polyisoprene, or other epoxy-modified rubber-based polymers can be used as the resin in the present invention. The epoxy-rubber can be capped with a compound comprising a saltable amine group.

In an alternative embodiment, cationic acrylic resins may be used. Acrylic polymers may be made cathodic by incorporation of amino-containing monomers, such as acrylamide, methacrylamide, N,N'-dimethylaminoethyl methacrylate tert-butylaminoethyl methacrylate. 2-vinylpyridine, 4-vinylpyridine, vinylpyrrolidine or other such amino monomers. Alternatively, epoxy groups may be incorporated by including an epoxy-functional monomer in the polymerization reaction. Such epoxy-functional acrylic polymers may be made cathodic by reaction of the epoxy groups with amines according to the methods previously described for the epoxy resins. The polymerization may also include a hydroxyl-functional monomer. Useful hydroxyl-functional ethylenically unsaturated monomers include, without limitation, hydroxyethyl methacrylate, hydroxyethyl acrylate, hydroxypropyl acrylate, hydroxypropyl methacrylate, hydroxybutyl acrylate, hydroxybutyl methacrylate, the reaction product of methacrylic acid with styrene oxide, and so on. Preferred hydroxyl monomers are methacrylic or acrylic acid esters in which the hydroxyl-bearing alcohol portion of the compound is a linear or branched hydroxy alkyl moiety having from 1 to about 8 carbon atoms.

The monomer bearing the hydroxyl group and the monomer bearing the group for salting (amine for a cationic group or acid or anhydride for anionic group) may be polymerized with one or more other ethylenically unsaturated monomers. Such monomers for copolymerization are known in the art. Illustrative examples include, without limitation, alkyl esters of acrylic or methacrylic acid, e.g., methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, the corresponding esters of maleic, fumaric, crotonic, isocrotonic, vinylacetic, and itaconic acids, and the like; and vinyl monomers such as styrene, t-butyl styrene, alpha-methyl styrene, vinyl toluene and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed.

The molecular weight of a typical acrylic resin is usually in the range from about 2000 to about 50,000, and preferably from about 3000 to about 15,000.

The amino equivalent weight of the cationic resin can range from about 150 to about 5000, and preferably from about 500 to about 2000. The hydroxyl equivalent weight of the resins, if they have hydroxyl groups, is generally between about 150 and about 2000, and preferably about 200 to about 800.

The resin is emulsified in water in the presence of a salting compound. When the resin has basic groups, such as amine groups, the resin is salted with an acid; when the resin has acid groups, the resin is salted with a base. Usually, the principal resin and the crosslinking agent are blended together before the resins are dispersed in the water. The unhydrolyzed or partially hydrolyzed polyvinyl formamide polymer may be blended with the principle resin and crosslinker before being dispersed in water; an at least partially hydrolyzed polyvinyl formamide polymer may be salted and dispersed in water. In a preferred embodiment, the resin groups are amine groups and are salted with an acid such as phosphoric acid, propionic acid, acetic acid, lactic acid, or citric acid. The salting acid may be blended with the resin or resins, mixed with the water, or both, before the resins are added to the water. The acid is used in an amount sufficient to neutralize enough of the amine groups of the principal resin to impart water-dispersibility to the resin. The resin may be fully neutralized; however, partial neutralization is usually sufficient to impart the required water-dispersibility. By "partial neutralization" it is meant that at least one, but less than all, of the saltable groups on the resin are neutralized. By saying that the resin is at least partially neutralized, it is meant that at least one of the saltable groups on the resin is neutralized, and up to all of such groups may be neutralized. The degree of neutralization that is required to afford the requisite water-dispersibility for a particular resin will depend upon its chemical composition, molecular weight, and other such factors and can readily be determined by one of ordinary skill in the art through straight-forward experimentation.

Similarly, the acid groups of an anionic resin are salted with an amine such as dimethylethanolamine or triethylamine. Again, the salting agent (in this case, an amine) may be blended with the resins, mixed with the water, or both, before the resins are added to the water. The resin is at least partially neutralized, but may be fully neutralized. At least enough acid groups are salted with the amine to impart water-dispersibility to the resin.

The saltable resin may be combined with a crosslinking agent before being dispersed in water. Crosslinking agents suitable for principle resins having particular functionalities are known in the art, and may be used singly or in combination. Of particular note are blocked polyisocyanates. Examples of aromatic, aliphatic or cycloaliphatic polyisocyanates include diphenylmethane-4,4'-diisocyanate (MDI), 2,4- or 2,6-toluene diisocyanate (TDI), p-phenylene diisocyanate, tetramethylene diisocyanate, hexamethylene diisocyanate, dicyclohexylmethane-4,4'-diisocyanate, isophorone diisocyanate, mixtures of phenylmethane-4,4'-diisocyanate, polymethylene polyphenylisocyanate, 2-isocyanatopropyl-cyclohexyl isocyanate, dicyclohexylmethane 2,4'-diisocyanate, 1,3-bis(iso-cyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methyl-heptane or 1-isocyanato-2-(3-isocyanatopropyl)-cyclohexane, and higher polyisocyanates such as triphenylmethane-4, 4',4"-triisocyanate, or mixtures of these polyisocyanates. Suitable polyisocyanates also include polyisocyanates derived from these that containing isocyanurate, biuret, allophanate, iminooxadiazinedione, urethane, urea, or uretdione groups. Polyisocyanates containing urethane groups, for example, are obtained by reacting some of the isocyanate groups with polyols, such as trimethylolpropane, neopentyl glycol, and glycerol, for example. The isocyanate groups are reacted with a blocking agent. Examples of suitable blocking agents include phenol, cresol, xylenol, epsilon-caprolactam, delta-valerolactam, gamma-butyrolactam, diethyl malonate, dimethyl malonate, ethyl acetoacetate, methyl acetoacetate, alcohols such as methanol or isobutanol, acid amides (e.g. acetoanilide), imides (e.g. succinimide), amines (e.g. diphenylamine), imidazole, urea, ethylene urea, 2-oxazolidone, ethylene imine, oximes (e.g. methylethyl ketoxime), and the like.

The electrocoat bath usually includes a small amount of higher boiling, cosolvents that contribute to coalescence and stability such as glycol ethers and glycol ether esters. Nonlimiting examples of coalescing solvents include alcohols, polyols and ketones. Specific coalescing solvents include monobutyl and monohexyl ethers of ethylene glycol, and phenyl ether of propylene glycol, monoalkyl ethers of ethylene glycol such as the monomethyl, monoethyl, monopropyl, and monobutyl ethers of ethylene glycol; dialkyl ethers of ethylene glycol such as ethylene glycol dimethyl ether; or diacetone alcohol. The amount of coalescing solvent is not critical and is generally between about 0 to 15 percent by weight, preferably about 0.5 to 5 percent by weight based on total weight of the resin solids.

The electrocoat bath usually includes one or more pigments and any further desired materials such as coalescing aids, antifoaming aids, and other additives. Conventional pigments for electrocoat primers include titanium dioxide, ferric oxide, carbon black, aluminum silicate, precipitated barium sulfate, aluminum phosphomolybdate, strontium chromate, basic lead silicate or lead chromate. The pigments may be dispersed using a grind resin or, preferably, a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10-40 percent by weight of the nonvolatile material in the bath. Preferably, the pigment is 15 to 30 percent by weight of the nonvolatile material in the bath. Any of the pigments and fillers generally used in electrocoat primers may be included. Extenders such as clay and anti-corrosion pigments are commonly included.

The electrodeposition coating compositions can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®. Surfactants and wetting agents, when present, typically amount to up to 2 percent by weight resin solids. Plasticizers are optionally included to promote flow or modify plating properties. Examples are high boiling water immiscible materials such as ethylene or propylene oxide adducts of nonyl phenols or bisphenol A. Plasticizers can be used at levels of up to 15 percent by weight resin solids.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

The electrocoat bath generally has an electroconductivity from 800 micromhos to 6000 micromhos. When conductivity is too low, it is difficult to obtain a film of desired thickness and having desired properties. On the other hand, if the composition is too conductive, problems such as the dissolution of substrate or counter electrode in the bath, uneven film thickness, rupturing of the film, or poor resistance of the film to corrosion or water spotting may result.

The coating composition according to the present invention is electrodeposited onto a substrate and then cured to form a coated article. The electrodeposition of the coating preparations according to the invention may be carried out by any of a number of processes known to those skilled in the art.

The electrodeposition coating composition may be applied on any conductive substrate, such as steel, copper, aluminum, or other metals or metal alloys, preferably to a dry film thickness of 10 to 35 µm. The article coated with the composition of the invention may be a metallic automotive part or body. After application, the coated article is removed from the bath and rinsed with deionized water. The coating may be cured under appropriate conditions, for example by baking at from about 275° F. to about 375° F. for between about 15 and about 60 minutes.

Following electrodeposition, the applied coating is usually cured before other coatings, if used, are applied. When the electrocoat layer is used as a primer in automotive applications, one or more additional coating layers, such as a primer-surfacer, color coat, and, optionally, a clearcoat layer, may be applied over the electrocoat layer. The color coat may be a topcoat enamel. In the automotive industry, the color coat is often a basecoat that is overcoated with a clearcoat layer. The primer surfacer and the topcoat enamel or basecoat and clearcoat composite topcoat may be ether waterborne or solventborne. The coatings can be formulated and applied in a number of different ways known in the art. For example, the resin used can be an acrylic, a polyurethane, or a polyester. Typical topcoat formulations are described in various US patents assigned to BASF Corporation or BASF AG. The coatings can be cured by any of the known mechanisms and curing agents, such as a melamine or blocked isocyanate.

The invention is further described in the following example. The example is merely illustrative and does not in any way limit the scope of the invention as described and claimed. All parts are parts by weight unless otherwise noted.

EXAMPLES

Electrocoat baths were prepared by combining 1500 parts by weight of an emulsion of an electrocoat primer binder (a 40 wt. % nonvolatiles aqueous emulsion having 27% by weight of an acid salted, amine-functional epoxy resin, 12% by weight of a blocked isocyanate crosslinker, and 2% by weight of a plasticizer) with 240 parts by weight of a pigment paste (a 67 wt. % nonvolatiles aqueous dispersion of 16% by weight of an acid salted, amine-functional epoxy resin and 51% by weight of a combination of pigments), and 2260 parts by weight of deionized water. Electrocoat coating compositions Examples 1-6 were prepared by incorporating into electrocoat baths of this composition hydrolyzed polyvinyl formamide as follows: Example 1, 400 ppm PVAM 9030 (30% hydrolyzed polyvinyl formamide); Example 2, 200 ppm PVAM 9030; Example 3, 100 ppm PVAM 9030; Example 4, 50 ppm PVAM 9010 (10% hydrolyzed polyvinyl formamide); Example 5, 100 ppm PVAM 9010; and Example 6, 50 ppm PVAM 9010. Comparative Example A was prepared having the same composition as Examples 1-6 but with 800 ppm polyvinyl alcohol in place of any polyvinyl formamide.

Panels were plated from each example electrocoat bath at a target filmbuild of 0.8 mil for testing. Testing was carried out by measuring smoothness in the longwave region (texture in 1-12 mm range) using a Byk-Gardner wave-scan instrument on panels over which reflective Nitto tape was applied, 60 degree gloss measured according to ASTM D523, film smoothness (Ra (µ-in)) measured by a profilometer, and edge isolation. Percent edge isolation (or "insulation capability") is measured by a sliding contact (pin) drawn along the panel parallel to the panel's edge at a constant speed and exerting little stylus pressure. Between pin and substrate there is an adjustable voltage source (0 to 1000V) with high internal resistance (10 MΩ). The voltage/time integral between pin and test panel is measured while the sliding contact travels a certain distance. This integral is dependent on the contact resistance between pin and substrate. The contact resistance is highly dependent on voltage: high voltage punctures occur as a function of the thickness of the insulation layers. The measure of the voltage-time integral at different voltages provides a figure for the insulation capability of the coating along the edge that has been measured.

The results are recorded in the following table.

| Example | Longwave | Gloss (60°) | Ra ($\mu$-in) | Edge isolation (%) |
|---|---|---|---|---|
| Comparative Ex. A (800 ppm PVA) | 15.7 | 77 | 7 | 99.7 |
| Ex. 1 (400 ppm PVAM 9030) (30% hydrolyzed) | 37.9 | 63 | 19 | 100 |
| Ex. 2 (200 ppm PVAM 9030) | 39.8 | 66 | 10 | 100 |
| Ex. 3 (100 ppm PVAM 9030) | 17.4 | 92.5 | 5 | 99.6 |
| Ex. 4 (150 ppm PVAM 9010) (10% hydrolyzed) | 13.4 | 94 | 5 | 97 |
| Ex. 5 (100 ppm PVAM 9010) | 16.7 | 100 | 3 | 90.2 |
| Ex. 6 (50 ppm PVAM 9010) | 11.7 | 100 | 16 | 86 |

The results show that increasing levels of polyvinyl formamide (PVAM) polymer increases the percent edge isolation (edge protection) of the electrocoat coating, but decreases gloss and smoothness of the coating. Compared to polyvinyl alcohol (PVA), polyvinyl formamide can provide comparable percent edge isolation at much lower levels with higher gloss and somewhat better smoothness. (For the longwave measurement, a smaller number indicates greater smoothness.)

The description is merely exemplary in nature and, thus, variations that do not depart from the gist of the disclosure are a part of the invention. Variations are not to be regarded as a departure from the spirit and scope of the disclosure.

What is claimed is:

1. An aqueous electrodeposition coating composition comprising (A) a binder, wherein the binder is electrodepositable cathodically or anodically and (B) an unhydrolyzed or at least partially hydrolyzed polyvinyl formamide polymer.

2. An aqueous electrodeposition coating composition according to claim 1, comprising from about 25 ppm to about 1000 ppm by weight of the unhydrolyzed or at least partially hydrolyzed polyvinyl formamide polymer.

3. An aqueous electrodeposition coating composition according to claim 1, comprising from about 50 ppm to about 100 ppm of the unhydrolyzed or at least partially hydrolyzed polyvinyl formamide polymer.

4. An aqueous electrodeposition coating composition according to claim 1, wherein the polyvinyl formamide polymer is hydrolyzed from about 10% to about 90% based on total formamide groups.

5. An aqueous electrodeposition coating composition according to claim 1, wherein the unhydrolyzed or at least partially hydrolyzed polyvinyl formamide polymer has a weight average molecular weight of from about 8,000 to about 500,000 daltons.

6. An aqueous electrodeposition coating composition according to claim 1, wherein the unhydrolyzed or at least partially hydrolyzed polyvinyl formamide polymer has monomer units other than vinyl amide or vinyl amine monomer units.

7. An aqueous electrodeposition coating composition according to claim 1, wherein the binder is depositable cathodically.

8. An aqueous electrodeposition coating composition according to claim 1, wherein the binder comprises a cathodically depositable epoxy resin.

9. An aqueous electrodeposition coating composition according to claim 8, wherein the binder further comprises a blocked polyisocyanate.

10. An aqueous electrodeposition coating composition according to claim 1, wherein the binder comprises a cathodically depositable resin and a crosslinker reactive with the cathodically depositable resin under curing conditions, and further wherein the crosslinker is reactive with the unhydrolyzed or at least partially hydrolyzed polyvinyl formamide polymer under curing conditions.

11. A method of coating an electrically conductive substrate, comprising
(a) placing the electrically conductive substrate into an aqueous electrodeposition coating composition according to claim 1,
(b) connecting the electrically conductive substrate as an electrode and passing a current through the aqueous electrodeposition coating composition to deposit a coating layer onto the electrically conductive substrate.

12. A method of coating an electrically conductive substrate according to claim 11, wherein the aqueous electrodeposition coating composition comprises a curable binder and wherein the method further comprises curing the coating layer.

13. A method of coating an electrically conductive substrate according to claim 12, wherein the aqueous electrodeposition coating composition comprises about 25 ppm to about 50 ppm by weight of the unhydrolyzed or at least partially hydrolyzed polyvinyl formamide polymer.

14. A coated electrically conductive substrate, comprising an electrically deposited coating layer on the substrate, the electrically deposited coating layer comprising an unhydrolyzed or at least partially hydrolyzed polyvinyl formamide polymer.

15. A coated electrically conductive substrate according to claim 14, wherein the electrically deposited coating layer further comprises a cured binder.

* * * * *